(12) United States Patent
Franca-Neto

(10) Patent No.: US 6,721,544 B1
(45) Date of Patent: Apr. 13, 2004

(54) DUPLEXER STRUCTURE FOR COUPLING A TRANSMITTER AND A RECEIVER TO A COMMON ANTENNA

(75) Inventor: Luiz M. Franca-Neto, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 09/711,344

(22) Filed: Nov. 9, 2000

(51) Int. Cl.$^7$ .............................................. H04B 1/44
(52) U.S. Cl. ...................... 455/83; 455/78; 455/129; 455/284; 455/340; 333/172; 343/750; 343/861
(58) Field of Search ...................... 455/83, 78, 425, 455/121, 129, 269, 271, 283, 280, 284, 344, 340; 333/172; 343/749, 750, 822, 852, 850, 860, 861

(56) References Cited

U.S. PATENT DOCUMENTS

| | | | |
|---|---|---|---|
| 4,055,807 A | * 10/1977 | Priniski et al. | 455/83 |
| 5,054,114 A | * 10/1991 | Erickson | 455/78 |
| 5,170,493 A | * 12/1992 | Roth | 455/82 |
| 5,193,218 A | * 3/1993 | Shimo | 455/80 |
| 5,375,256 A | * 12/1994 | Yokoyama et al. | 455/80 |
| 5,697,069 A | * 12/1997 | Bohm et al. | 455/83 |
| 5,787,339 A | * 7/1998 | Asazawa | 455/83 |
| 5,878,331 A | * 3/1999 | Yamamoto et al. | 455/83 |
| 5,896,562 A | * 4/1999 | Heinonen | 455/76 |
| 6,009,314 A | * 12/1999 | Bjork et al. | 455/83 |
| 6,023,609 A | * 2/2000 | Futamura | 455/82 |
| 6,122,488 A | * 9/2000 | Leizerovich et al. | 455/78 |
| 6,381,446 B1 | * 4/2002 | Meixner | 455/82 |
| 6,385,438 B1 | * 5/2002 | Zellweger et al. | 455/78 |
| 6,445,039 B1 | * 9/2002 | Woo et al. | 257/355 |
| 6,466,770 B1 | * 10/2002 | Griffith et al. | 455/91 |
| 6,526,263 B1 | * 2/2003 | Saito | 455/78 |

FOREIGN PATENT DOCUMENTS

| | | | | |
|---|---|---|---|---|
| JP | 362122417 A | * | 6/1987 | 326/121 |
| JP | 406244756 A | * | 2/1993 | 455/83 |

* cited by examiner

*Primary Examiner*—Vivian Chin
*Assistant Examiner*—Charles Craver
(74) *Attorney, Agent, or Firm*—Schwegman, Lundberg, Woessner & Kluth, P.A.

(57) ABSTRACT

A duplexer structure for allowing an RF transmitter and an RF receiver to share a common antenna includes impedance matching circuitry to match the receiver input impedance to the antenna impedance during a receive operation and impedance transformation circuitry to transform the antenna impedance to a lower impedance at the receiver input terminals during a transmit operation. The impedance matching circuitry and the impedance transformation circuitry of the duplexer share one or more passive components, thus reducing the overall number of components required to implement the duplexer. This reduction in component count reduces the amount of chip area required to implement the duplexer and increases the ease with which the RF transceiver is integrated onto a semiconductor chip. In one embodiment, the duplexer uses a differential topology to provide common mode noise rejection and even harmonic distortion cancellation within a transceiver.

25 Claims, 3 Drawing Sheets

DUPLEXER STRUCTURE FOR COUPLING A TRANSMITTER AND A RECEIVER TO A COMMON ANTENNA

FIELD OF THE INVENTION

The invention relates generally to radio frequency transceivers and, more particularly, to transceivers having a transmitter and a receiver that share a common antenna.

BACKGROUND OF THE INVENTION

It is often desirable to have a radio frequency (RF) transmitter and receiver share a common antenna. This practice reduces the overall cost of implementing an RF system by eliminating one antenna. It also ensures that the transmit and receive beams of the system are identical. A number of challenges arise, however, in implementing a shared antenna arrangement. For example, during transmit operations, the relatively high transmit power generated by the transmitter cannot be permitted to overload the front end of the receiver. In addition, during a receive operation, the received signal must be directed from the antenna to the receiver input with little loss in the intervening circuitry. Furthermore, both the transmitter and the receiver must be appropriately matched to the antenna during transmit and receive operations, respectively, to enhance power transfer between these elements. Duplexer structures are normally employed to address these issues.

An ongoing trend in the electronics industry is to integrate entire systems or subsystems onto a single semiconductor chip using, for example, very large scale integration (VLSI) techniques. Because of its characteristic low power consumption, low cost, and high integration density, complementary metal-oxide-semiconductor (CMOS) technology is often used to achieve this integration. The integration of RF transceiver subsystems, however, has thus far presented a major challenge to circuit designers. This is because RF transceivers typically make extensive use of passive components (e.g., inductors and capacitors) which are not easily implemented on a semiconductor chip. Another reason is because RF transceivers are generally required to detect very small signals from an antenna which can be obscured by, for example, digital switching noise when the RF circuitry is implemented on the same chip as digital circuitry performing control and signal processing functions for the transceiver. This is especially true for RF transceiver subsystems that utilize antenna sharing.

DETAILED DESCRIPTION

Figure 1:
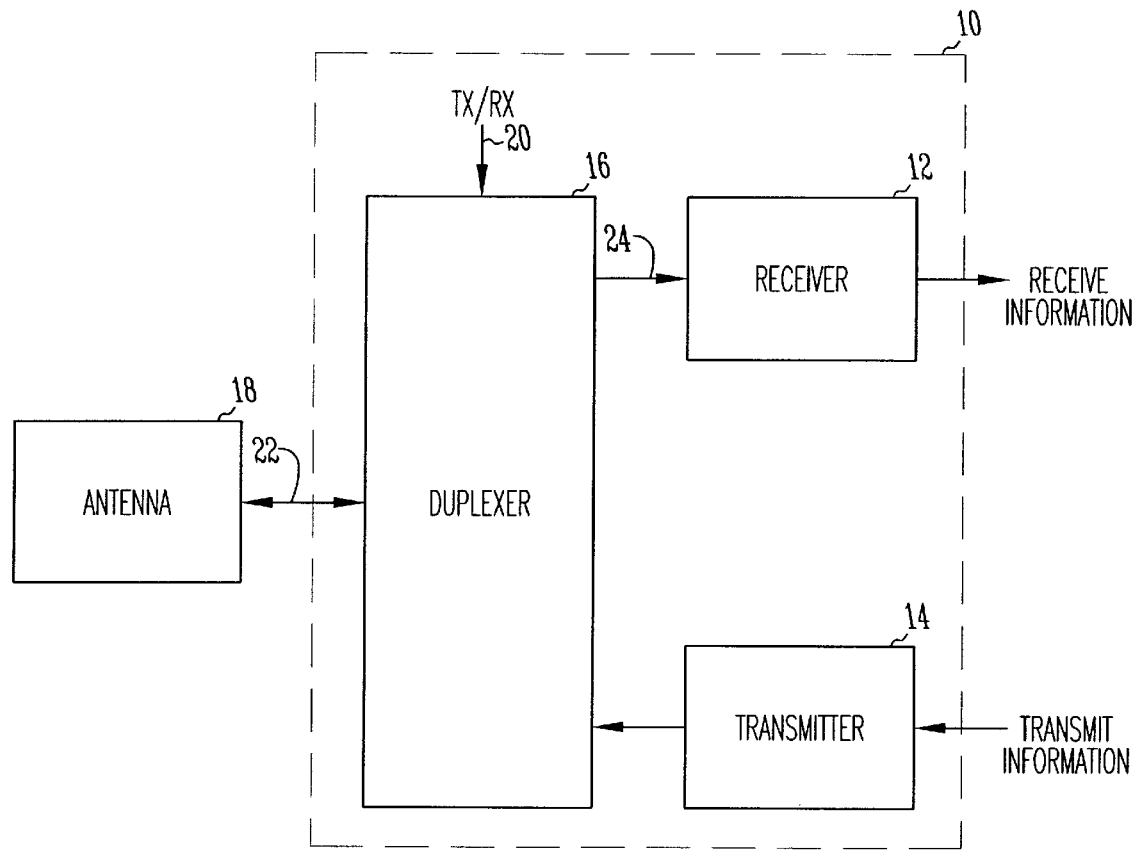
FIG. 1 is a block diagram illustrating an RF transceiver in accordance with one embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to a duplexer structure that allows an RF transmitter and an RF receiver to share a common antenna. The duplexer includes impedance matching circuitry to match the receiver input impedance to the antenna impedance during a receive operation and impedance transformation circuitry to transform the antenna impedance to a lower impedance at the receiver input terminals during a transmit operation (to protect the receiver from damage). Significantly, the impedance matching circuitry and the impedance transformation circuitry of the duplexer share one or more passive components. This component sharing reduces the overall number of passive components within the corresponding RF transceiver, thus increasing the ease with which the RF transceiver is integrated onto a semiconductor chip and reducing the amount of chip area required to implement the duplexer. In one embodiment, the duplexer uses a differential topology to provide common mode noise rejection and even harmonic distortion cancellation. This is beneficial when the duplexer is located within a hostile digital environment (e.g., when the duplexer is implemented on the same chip with digital control circuitry). The differential topology also allows the duplexer structure to take advantage of the high integration capabilities of CMOS technology.

FIG. 1 is a block diagram illustrating an RF transceiver 10 in accordance with one embodiment of the present invention. As shown, a receiver 12 and a transmitter 14 are each coupled to a duplexer 16 that communicates with an external antenna 18. The duplexer 16 includes an input 20 for receiving a transmit/receive (TX/RX) signal that is indicative of the present operational state of the transceiver. If the TX/RX signal indicates that the transmitter 14 is currently active (i.e., a transmit operation is being performed), the duplexer 16 is configured so that the transmitter 14 is appropriately coupled to the antenna 18 to deliver a relatively high power transmit signal thereto. Although the voltage swing at the antenna port 22 will typically be relatively high during the transmit operation, the duplexer 16 is designed so that the voltage swing at the input port 24 of the receiver 12 remains relatively low during the transmit operation to prevent damage to the front end receiver circuitry. As will be described in greater detail, this is accomplished by implementing an impedance transformation within the duplexer 16 that transforms the relatively large antenna impedance to a much lower impedance at the input port 24 of the receiver 12.

If the TX/RX signal indicates that a receive operation is being performed, the duplexer 16 is configured so that the antenna 18 is coupled through to the receiver 12 in a relatively low loss manner. In previous transceiver designs, the receiver has typically been internally matched so that an input impedance of the receiver was the same as, or similar to, the antenna impedance. Thus, the intervening duplexer in these designs only needed to provide a through connection at substantially the same impedance to generate a low loss connection between the antenna and the receiver during receive mode. In one aspect of the present invention, however, the duplexer 16 includes matching circuitry for matching the input impedance of the receiver 12 to the impedance of the antenna 18 during receive operations, thus reducing or eliminating the need to provide internal matching within the receiver 12. In addition, in accordance with one embodiment of the invention, this matching circuitry shares one or more passive components with the impedance transformation circuitry used during transmit operations. As can be appreciated, this component sharing reduces the amount of chip space required to implement the duplexer and simplifies the integration process.

Figure 2:
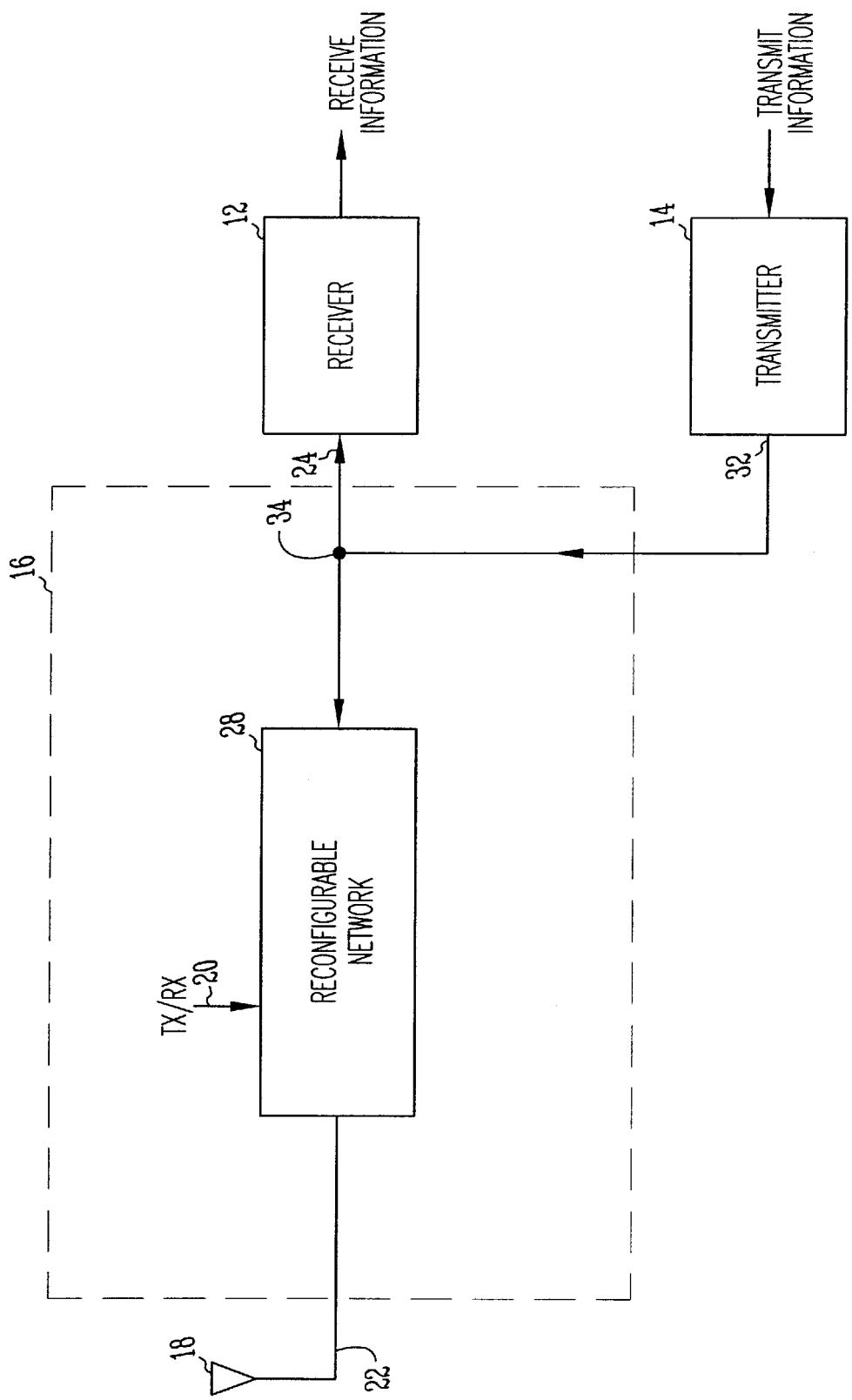
FIG. 2 is a block diagram illustrating the internal configuration of a duplexer within the RF transceiver of FIG. 1 in one embodiment of the present invention.

FIG. 2 is a block diagram illustrating an internal configuration of the duplexer 16 of FIG. 1 in one embodiment of the present invention. As shown, the duplexer 16 includes a reconfigurable network 28 that is configured as an impedance matching network during receive operations and as an impedance transformation network during transmit operations. In the illustrated embodiment, the input 24 of the receiver 12 is directly coupled to the output 32 of the transmitter 14 within the duplexer 16. In another embodiment, as will be described in greater detail below, additional switching functionality is provided within the duplexer 16 for isolating the transmitter 14 during receive operations. The network 28 receives the TX/RX signal at input 20 which configures the network 28 based on the current operational state of the transceiver 10. The impedance transformation of the network 28 during transmit operations transforms the antenna impedance at the antenna port 22 (e.g., 50 ohms) to a relatively low impedance (e.g., 10 ohms) at the input port 24 of the receiver 12. Thus, although the voltage swing at the antenna port 22 will typically be relatively high during a transmit operation to achieve a desired transmission range, the voltage swing at the input terminal 24 of the receiver 12 will remain low. The impedance transformation is designed so that the maximum anticipated voltage swing at the antenna port 22 during a transmit operation will require a voltage swing at circuit node 34 (and thus the input port 24 of the receiver 12) that is below a value that could potentially damage the receiver front end. The impedance transformation should also provide a good impedance match between the output 32 of the transmitter 14 and the antenna 18.

Figure 3:
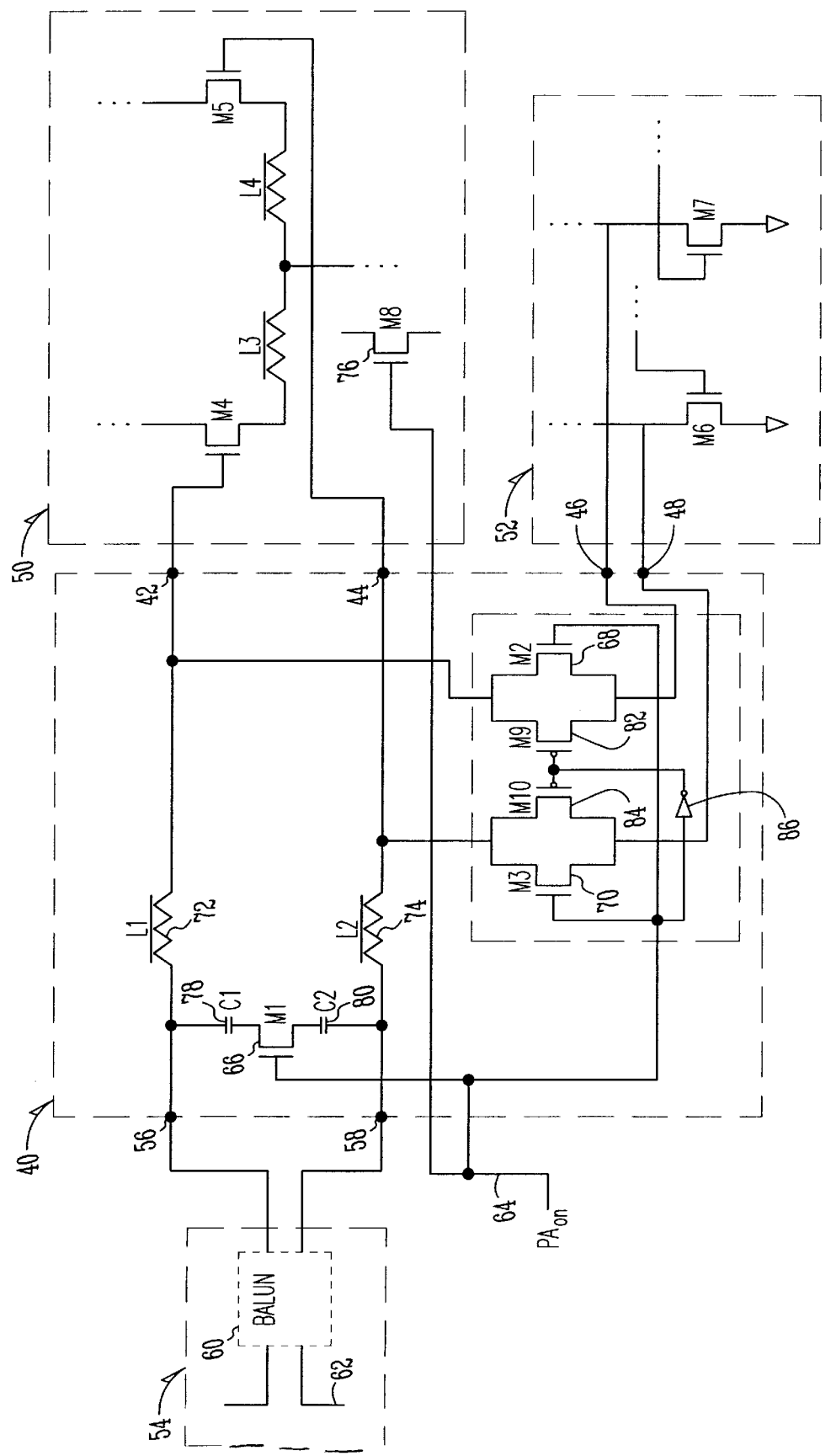
FIG. 3 is a schematic diagram illustrating a differential duplexer circuit in accordance with one embodiment of the present invention.

As described above, in one embodiment of the present invention, the impedance matching network and the impedance transformation network implemented within the duplexer 16 share one or more passive circuit elements. That is, the impedance matching network will use the circuit element(s) during receive operations and the impedance transformation network will use the circuit element(s) during transmit operations. By implementing element sharing within the duplexer 16, the physical size of the resulting circuit can be reduced. FIG. 3 is a schematic diagram illustrating a duplexer circuit 40 that employs element sharing in accordance with one embodiment of the present invention. The duplexer circuit 40 is a differential circuit and thus provides common mode noise isolation and even mode distortion cancellation. The duplexer circuit 40 includes first and second receiver terminals 42, 44 for connection to a low noise amplifier (LNA) 50 that is part of an RF receiver; first and second transmitter terminals 46, 48 for connection to a power amplifier (PA) that is part of an RF transmitter; and first and second antenna terminals 56, 58 for connection to an antenna assembly 54. As illustrated, the antenna assembly 54 includes an optional balun 60 for use in coupling the balanced antenna terminals 56, 58 to a single-ended antenna structure 62 (if this is the type of antenna used).

The duplexer 40 includes an input terminal 64 to receive a control signal PAon that is high whenever the power amplifier 52 is active and low at all other times. The input terminal 64 is connected to the gate terminals of three n-type metal oxide semiconductor (NMOS) transistor switches ($M_1$, $M_2$, and $M_3$) 66, 68, 70 within the duplexer 40. The input terminal 64 is also connected to the gate terminals of two p-type metal oxide semiconductor (PMOS) transistor switches ($M_9$ and $M_{10}$) 82, 84 through an inverter 86. The PAon signal is also delivered to a disable transistor ($M_8$) 76 within the LNA 50 to deactivate the INA 50 when the power amplifier 52 is active. In the illustrated embodiment, this is achieved by shorting the bias to the first stage current source within the LNA 50 when PAon is high. As illustrated, the first receiver terminal 42 is connected to the first antenna terminal 56 through a first inductor ($L_1$) 72 and the second receiver terminal 44 is connected to the second antenna terminal 58 through a second inductor ($L_2$) 74. The first NMOS transistor 66 is connected at one source/drain terminal to a first capacitor ($C_1$) 78 and at the other source/drain terminal to a second capacitor ($C_2$) 80. The first and second capacitors 78, 80 are each coupled at another end to the first and second antenna terminals 56, 58, respectively. The second NMOS transistor 68 and the first PMOS transistor 82 are each connected at one source/drain terminal to the first transmitter terminal 46 and at the other source/drain terminal to the first receiver terminal 42. Similarly, the third NMOS transistor 70 and the second PMOS transistor 84 are each connected at one source/drain terminal to the second transmitter terminal 48 and at the other source/drain terminal to the second receiver terminal 44.

As discussed above, when the power amplifier 52 is active, the PAon signal is logic high. Thus, the first, second, and third NMOS transistors 66, 68, 70 and the first and second PMOS transistors 82, 84 are turned "on." The second NMOS transistor 68 and the first PMOS transistor 82 act collectively as a pass gate for coupling the first transmitter terminal 46 to the first receiver terminal 42 when the PAon signal is logic high. Similarly, the third NMOS transistor 70 and the second PMOS transistor 84 act collectively as a pass gate for coupling the second transmitter terminal 48 to the second receiver terminal 44 when the PAon signal is logic high. In addition, the first NMOS transistor 66 appears as a very low impedance (e.g., a short circuit) between the first and the second capacitors 76, 78 when the PAon signal is high. Therefore, during a transmit operation, the power amplifier 52 is coupled to the antenna 54 through an LC network consisting of the first and second series inductors 72, 74 and the first and second shunt capacitors 78, 80. The inductance value of the first and second inductors 72, 74 and capacitance value of the first and second capacitors 76, 78 are selected so that the resulting LC configuration matches the output impedance of the power amplifier 52 to the antenna impedance at the antenna terminals 56, 58 (i.e., using an L match arrangement). Importantly, the LC configuration also behaves as an impedance transformation between the antenna terminals 56, 58 and the receiver terminals 42, 44 to transform the antenna impedance at the antenna terminals 56, 58 to a relatively low impedance at the receiver terminals 42, 44. It should be appreciated that other circuit configurations for performing this matching/impedance transformation function are also possible, including, for example, the well known π match circuit. Methods for designing such circuits are well known in the art.

Because the impedance is low at the receiver terminals 42, 44 during transmit, the transmit signal being generated by the power amplifier 52 will maintain a relatively low voltage swing at the receiver terminals 42, 44. In accordance with the invention, the transmit voltage swing at the receiver terminals 42, 44 will be kept below a value that could potentially damage the input devices $M_4$ and $M_5$ (or other circuitry) within the LNA 50. Because the impedance at the receiver terminals 42, 44 is low, the currents being developed at the first and second transmitter terminals 46, 48 will be relatively high. However, because the input impedance of the LNA 50 is high, this current will not flow into or damage the LNA 50. The second and third NMOS transistors 68, 70 and the first and second PMOS transistors 82, 84, on the other hand, must be designed to handle this current load. The transmit signal generated by the power amplifier 52 will be transformed by the action of the LC configuration into a relatively high voltage swing signal at the antenna terminals 56, 58. Thus, the signal transmitted by the antenna 62 will have sufficient power to reach a remote transceiver with adequate signal level. Although the voltage swing on the antenna terminals 56, 58 will be relatively high, the first transistor switch 66 will not be damaged because it is located at a low voltage virtual ground between the antenna terminals 56, 58.

When the PAon signal goes low, the first, second, and third NMOS transistors 66, 68, 70 and the first and second PMOS transistors 82, 84 within the duplexer 40 are turned "off." In addition, the disable transistor 76 within the LNA 50 is turned "off," thus enabling the LNA 50. The first and second transmitter terminals 46, 48 are now isolated from the first and second receiver terminals 42, 44, respectively. Furthermore, the first NMOS transistor 66 now appears as an open circuit between the first and second capacitors 78, 80, effectively removing the capacitors 78, 80 from the circuit. In this mode, the first and second inductors 72, 74 are used as matching elements to match the antenna impedance at the antenna terminals 56, 58 to the input impedance Attorney of the LNA 50. In one approach, the parasitic capacitances of the second and third NMOS transistors 68, 70 and the first and second PMOS transistors 82, 84 (in the "off" state) are used as additional tuning elements to match the antenna 62 to the LNA 50. Transistor design methods for achieving a desired parasitic capacitance at the appropriate terminals of the second and third transistor switches 68, 70 for a given set of bias conditions are known in the art.

The selection of the inductance value of the first and second inductors 72, 74 and the capacitance value of the first and second capacitances 78, 80 (and, if used, the parasitic capacitance value of the second and third NMOS transistors 68, 70 and the first and second PMOS transistors 82, 84 in the "off" state) is preferably performed as part of a single design process to achieve the dual goals of providing transformer action during transmit and impedance matching during receive. Techniques for accomplishing this are well known in the art and normally involve the use of computer based circuit design and analysis tools. The design may require that some additional matching circuitry be implemented within the LNA 50 and/or the power amplifier 52 to interact with the circuit elements within the duplexer 40 during receive and/or transmit mode to adequately match the antenna 62 to the LNA 50 and the power amplifier 52. The actual design that is implemented will depend upon the intrinsic input impedances of the LNA 50 and the power amplifier 52 before impedance matching/transformation is undertaken. It should be appreciated that the particular arrangement of inductances and capacitances within the duplexer 40 of FIG. 3 is merely an illustration of one possible approach. As will be apparent to a person of ordinary skill in the art, many alternative circuit element configurations can be implemented to achieve the dual goals of providing transformer action during transmit and impedance matching during receive.

In the illustrated embodiment, the three NMOS transistors 66, 68, 70 and the two PMOS transistors 82, 84 are metal-oxide-semiconductor field effect transistors (MOSFETs). This allows the duplexer 40 to be easily integrated within a CMOS environment. It should be appreciated, however, that other transistor types can also be used in accordance with the present invention, such as other insulated-gate FET structures, bipolar junction transistors, junction FETs, and others. In one embodiment of the invention, the duplexer 40 of FIG. 3 is implemented without the second and third NMOS transistors 68, 70 and the first and second PMOS transistors 82, 84. In this embodiment, the first and second transmitter terminals 46, 48 are connected directly to the first and second receiver terminals 42, 44, respectively. Using well known RF techniques, the length of the lines coupling the transmitter terminals 46, 48 to the receiver terminals 42, 44 can be adapted to provide a minimal impedance effect (e.g., an open circuit) at the receiver input terminals 42, 44 during receive mode.

Using the duplexer 40 of FIG. 3, it is possible to connect multiple transceivers to a single antenna 62, as long as only one transceiver is allowed to operate at any given time. In one approach, multiple power amplifiers 52 are connected to the transmitter terminals 46, 48 in parallel and multiple LNAs 50 are connected to the receiver terminals 42, 44 in parallel. The PAon signal is high if any of the power amplifiers 52 are enabled. As long as only a single power amplifier 52 or a single LNA 50 is operative at a time, the duplexer 40 will operate in substantially the same manner described above. Alternatively, additional transistor switches can be provided at the transmitter terminals 46, 48 and/or the receiver terminals 42, 44 to switch between the multiple transceivers in response to a control signal. This technique provides greater isolation between individual transceivers, but adds complexity to the duplexer 40. Other multi-transceiver topologies are also possible. In particular, simultaneous operation of multiple transceivers can be enabled if the transceivers each operate at frequency multiples of one another such that the transmission lines connecting each transceiver to the antenna appear as open circuits to the other transceivers.

Two inductors $L_3$ and $L_4$ are coupled between the input devices $M_4$ and $M_5$ within the LNA 50. A tasistor $M_6$ is coupled to the second transittcr terminal 48 and a transistor $M_7$ is coupled to the first transfinite terminal 46 in the power amplifier 52.

With reference to FIG. 3, in one aspect of the present invention, the duplexer 40, the LNA 50, and the power amplifier 52 are all integrated on the same semiconductor chip. In one embodiment, very large scale integration (VLSI) techniques are used to integrate the elements. Preferably, the elements will be integrated using well known CMOS techniques, although other processes are also possible. Additional elements within the receiver and transmitter circuits (i.e., other than the LNA 50 and power amp 52, respectively) can also be integrated on the chip. In one embodiment, for example, an entire transceiver subsystem including receiver, transmitter, duplexer, and digital circuitry for control and/or signal processing is integrated onto a single chip. The chip will preferably be housed within an integrated circuit package for easy mounting on a circuit board or the like. The circuit board may then be coupled to an antenna, either with or without an intervening balun structure (depending on the type of antenna used). In one approach, a balun is implemented on the semiconductor chip with the other circuitry.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A duplexer to allow a receiver and a transmitter to share a common antenna comprising:
    an antenna port to connect the duplexer to an antenna;
    a receiver port to connect the duplexer to a receiver;
    a transmitter port to connect the duplexer to a transmitter;
    an interconnect to couple said transmitter port to said receiver port; and
    a reconfigurable network coupled to said antenna port, said receiver port and said transmitter port, said reconfigurable network to provide an impedance matching circuit between the antenna and the receiver during a receive operation and to provide an impedance transformation circuit between the antenna and the transmitter during a transmit operation, said impedance transformation circuit comprising an inductor coupled to a capacitor and said impedance matching circuit comprising the inductor counted to the capacitor that is removed from the reconfigurable network.

2. The duplexer claimed in claim 1, wherein;
    said impedance transformation circuit is to transform an antenna impedance at said antenna port to a significantly lower impedance at said transmitter port.

3. The duplexer claimed in claim 1, wherein:
    said impedance matching circuit is to match a receiver input impedance at said receiver port to an antenna impedance at said antenna port.

4. The duplexer claimed in claim 1, wherein:
    said reconfigurable network includes a switch to switch between said impedance matching circuit and said impedance transformation circuit in response to a control signal.

5. The duplexer claimed in claim 1, wherein:
    said interconnect includes at least one switch to connect said transmitter port to said receiver port in response to a control signal.

6. The duplexer claimed in claim 1, wherein:
    said interconnect includes at least one pass gate to connect said transmitter port to said receiver port in response to a control signal, said at least one pass gate including an NMOS transistor and a PMOS transistor.

7. The duplexer claimed in claim 1, wherein:
    said interconnect includes at least one conductive line to directly connect said transmitter port to said receiver port.

8. The duplexer claimed in claim 1, wherein:
    said antenna port, said receiver port, and said transmitter port each include first and second differential terminals.

9. A duplexer to allow a receiver and a transmitter to share a common antenna comprising:
    first and second antenna terminals to connect the duplexer to an antenna;
    first and second receiver terminals to connect the duplexer to a receiver, first and second transmitter terminals to connect the duplexer to a transmitter;
    a first interconnect to couple said first transmitter terminal to said first receiver terminal;
    a second interconnect to couple said second transmitter terminal to said second receiver terminal; and
    a switchable network connected between said first and second receiver terminals and said first and second antenna terminals, said switchable network including at least one switch for changing said switchable network between first and second configurations, said first configuration of said switchable network to match an antenna impedance at said first and second antenna terminals to a receiver input impedance at said first and second receiver terminals and said second configuration of said switchable network to transform said antenna impedance at said first and second antenna terminals to a significantly lower impedance at said first and second transmitter terminals, said second configuration of said switchable network including a differential L match circuit between said first and second antenna terminals and said first and second receiver terminals.

10. The duplexer claimed in claim 9, wherein:
    said first and second configurations of said switchable network share at least one passive circuit element.

11. The duplexer claimed in claim 9, wherein:
    said first interconnect includes a conductive line to directly connect said first transmitter terminal to said first receiver terminal.

12. The duplexer claimed in claim 9, wherein,
    said first interconnect includes a transistor to controllably couple said first transmitter terminal to said first receiver terminal.

13. The duplexer claimed in claim 12, wherein:
    said transistor includes a parasitic capacitance that is part of a matching network associated with said first configuration of said switchable network.

14. The duplexer claimed in claim 9, wherein:
    said fist interconnect includes a first pass gate to controllably couple said first transmitter terminal to said first receiver terminal, said first pass gate including a PMOS device and an NMOS device.

15. The duplexer claimed in claim 9, wherein:
    said at least one switch includes a transistor having first and second output terminals, said first output terminal being coupled to said first antenna terminal through a first circuit element and said second output terminal being coupled to said second antenna terminal through a second circuit element, said first and second circuit elements having a first element type.

16. The duplexer claimed in claim 15, wherein:
    said switchable network includes a third circuit element connected between said first receiver terminal and said first antenna terminal and a fourth circuit element connected between said second receiver terminal and said second antenna terminal, said third and fourth circuit elements having a second element type, wherein said second element type is different from said first element type.

17. The duplexer claimed in claim 16, wherein:
    said first and second circuit elements are capacitors and said third and fourth circuit elements are inductors.

18. The duplexer claimed in claim 9, wherein:
    said at least one switch includes a transistor for changing said switchable network between said first and second configurations, said transistor changing said switchable network to said first configuration during a receive operation and said transistor changing said switchable network to said second configuration during a transmit operation, said transistor being located at a virtual ground.

19. A transceiver comprising:

a transmitter;

a receiver; and a duplexer to allow said transmitter and said receiver to share a common antenna, said duplexer including:
an antenna port to connect the duplexer to an antenna;
a receiver port to connect the duplexer to said receiver;
a transmitter port to connect the duplexer to said transmitter;
an interconnect to couple said transmitter port to said receiver port; and
a reconfigurable network coup led to said antenna port, said receiver port and said transmitter port, said reconfigurable network to provide an impedance matching circuit between said antenna and said receiver during a receive operation and to provide an impedance transformation circuit between said antenna and said receiver during a transmit operation, said impedance transformation circuit comprising an inductor coupled to a capacitor and said impedance matching circuit comprising the inductor coupled to the capacitor that is removed from the reconfigurable network.

20. The transceiver claimed in claim 19, wherein:

said receiver port and said transmitter port of said duplexer each include first and second differential terminals.

21. The transceiver claimed in claim 19 wherein:

said transmitter, said receiver, and said duplexer are all implemented on a common semiconductor chip.

22. The transceiver claimed in claim 21 wherein:

said transmitter, said receiver, and said duplexer are implemented on said common semiconductor chip using VLSI techniques.

23. The transceiver claimed in claim 21 wherein:

said transmitter, said receiver, and said duplexer are implemented on said common semiconductor chip using CMOS structures.

24. The transceiver claimed in claim 21 comprising:

digital control circuitry for controlling the operation of said transceiver, said digital control circuitry being implemented on said common semiconductor chip with said transmitter, said receiver, and said duplexer.

25. The transceiver claimed in claim 21 comprising:

signal processing circuitry for processing receive data from said receiver, said signal processing circuitry being implemented on said common semiconductor chip with said transmitter, said receiver, and said duplexer.

* * * * *

UNITED STATES PATENT AND TRADEMARK OFFICE
CERTIFICATE OF CORRECTION

PATENT NO. : 6,721,544 B1
DATED : April 13, 2004
INVENTOR(S) : Franca-Neto

It is certified that error appears in the above-identified patent and that said Letters Patent is hereby corrected as shown below:

Column 7,
Line 29, delete "counted" and insert -- coupled --, therefor.
Line 31, after "wherein" delete ";" and insert -- : --, therefor.
Line 66, after "receiver" delete "," and insert -- ; --, therefor.

Column 8,
Line 31, after "wherein" delete "," and insert -- : --, therefor.

Column 9,
Line 18, delete "coup led" and insert -- coupled --, therefor.

Signed and Sealed this

Tenth Day of August, 2004

JON W. DUDAS
*Acting Director of the United States Patent and Trademark Office*